Patented Sept. 22, 1925.

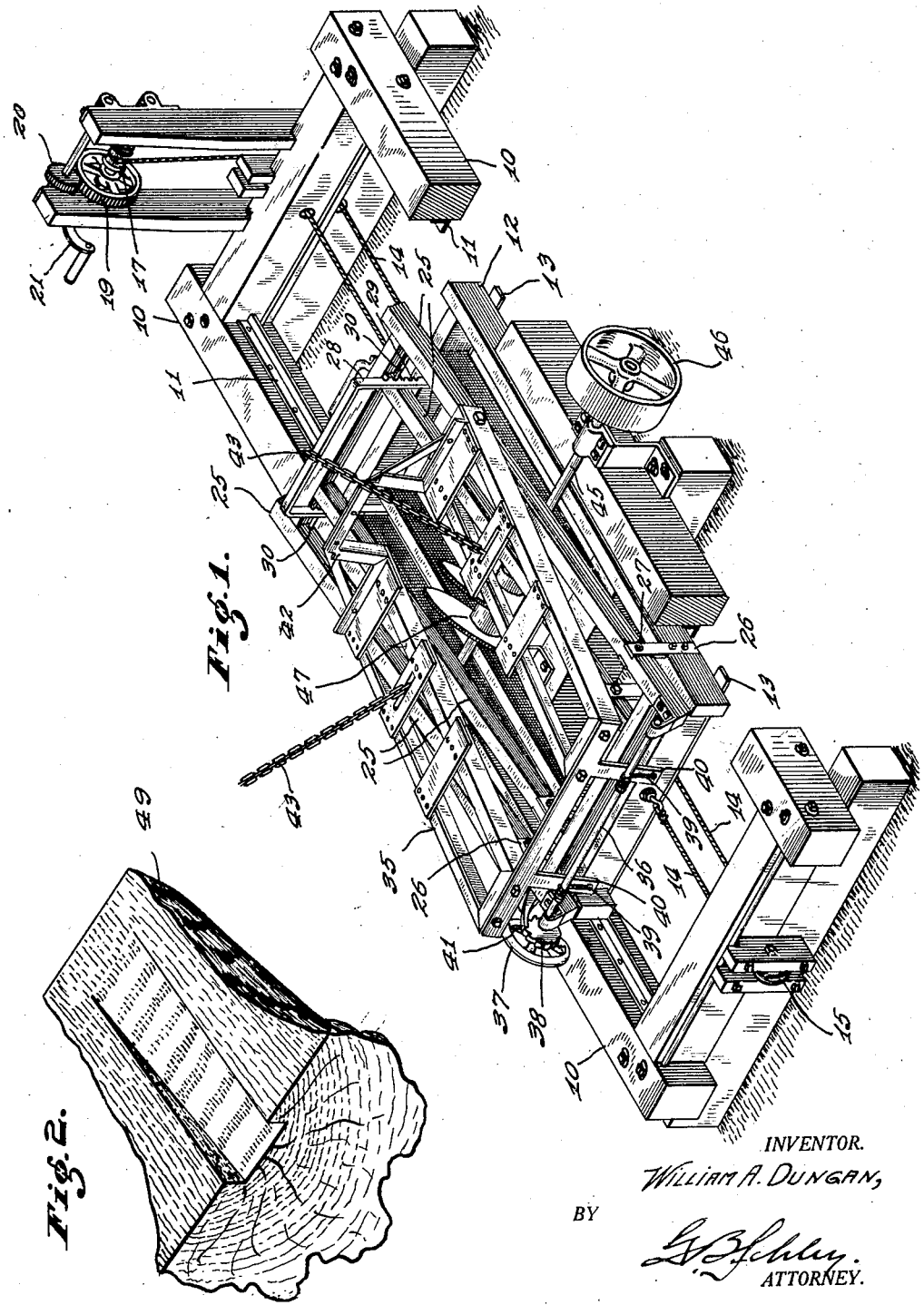

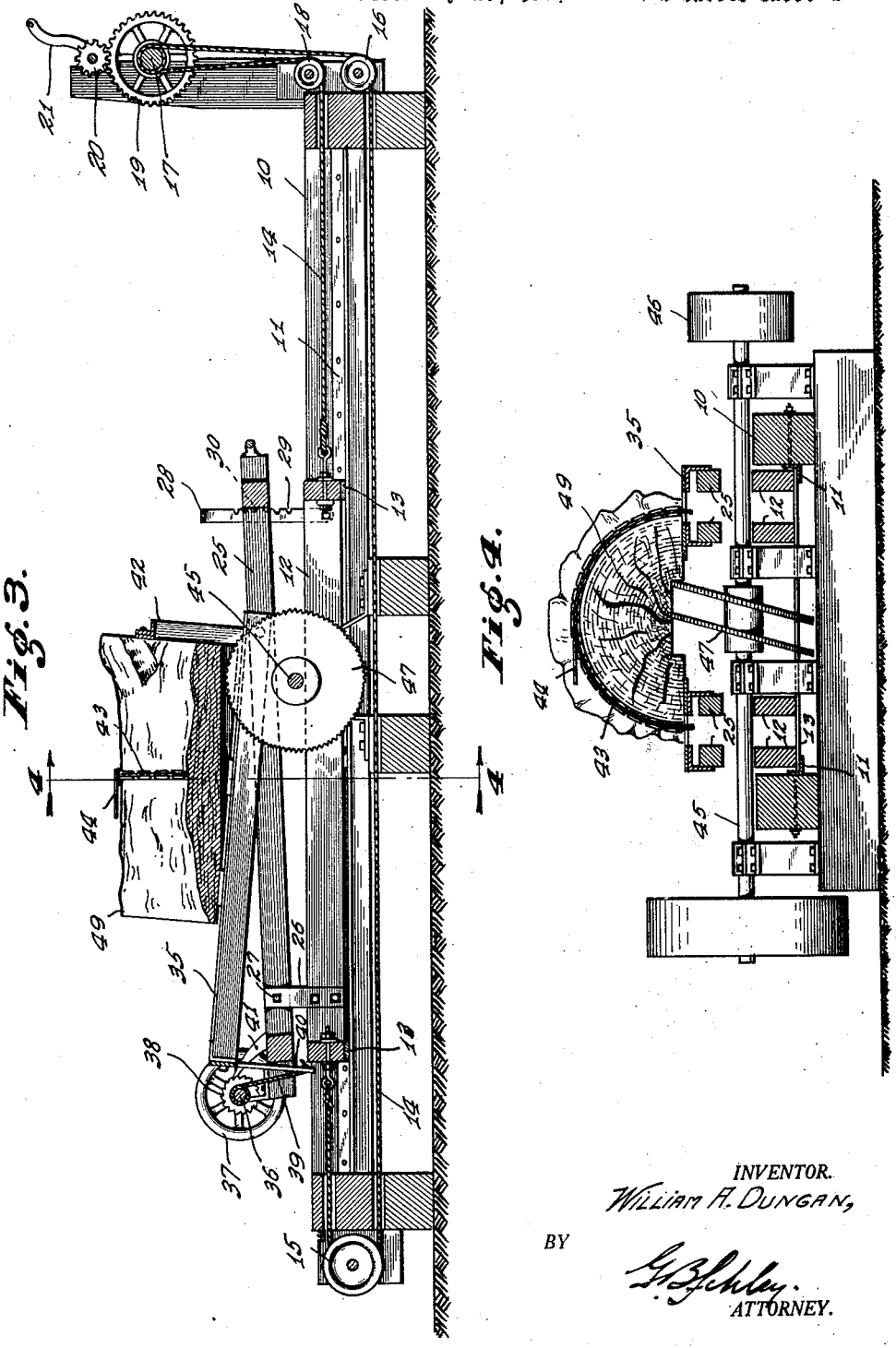

1,554,424

UNITED STATES PATENT OFFICE.

WILLIAM A. DUNGAN, OF INDIANAPOLIS, INDIANA.

STUMP ROUTER.

Application filed May 28, 1924. Serial No. 716,315.

*To all whom it may concern:*

Be it known that I, WILLIAM A. DUNGAN, a citizen of the United States, residing at Indianapolis, in the county of Marion and State of Indiana, have invented a new and useful Stump Router, of which the following is a specification.

In the process of slicing veneer from stumps, it is customary to split the stump longitudinally, mount a stump-half on the arbor or stay-log of a veneer cutter, and cut the veneer from the stump as the latter is revolved. If the stump is clamped in such a position on the arbor that its longitudinal plane face is substantially parallel to the axis of rotation, it is necessary to reduce the stump substantially to a semi-cylinder of a diameter equal to the minimum diameter of the stump before any usable veneer is produced. In reducing the stumps to this diameter, a great deal of material is wasted.

It is the object of my invention to reduce this waste by providing a stump-router which will cut a longitudinal groove in the longitudinal plane face of the stump-half, which groove will be of a width great enough to receive the arbor of the veneer machine and of maximum depth at the ground end of the stump and uniformly diminishing in depth toward the other end of the stump. If the stump-half is then mounted on the veneer cutter with the sloping bottom of the groove against the arbor, strips of veneer of a length equal to the length of the stump will be cut as soon as surface irregularities have been removed.

I accomplish the above object by providing a suitable stump-carrying carriage which is movable past a rotating cutter which is adapted to cut the desired groove in the stump, and I provide this carriage with adjustments so that the depth of the groove and its taper can be varied as desired.

The accompanying drawing illustrates my invention: Fig. 1 is a perspective of my stump router with parts of one of the side bars of the frame broken away; Fig. 2 is a perspective view of a stump-half, showing the groove which my stump router produces; Fig. 3 is a longitudinal section of my stump router; and Fig. 4 is a transverse section on the line 4—4 of Fig. 3.

A rigid rectangular frame 10 carries a pair of longitudinally extending angle irons 11 which serve as supports and guides for a movable carriage 12. The carriage 12 is supported from the angle irons 11 by means of two or more steel bars 13 which conveniently extend across the under side of the carriage 12, project beyond the sides thereof, and rest on the upper faces of the horizontal legs of the angle irons 11. While other means may be employed for supporting the carriage 12 on the guides 11, I prefer to use the bars 13 for this purpose; as, in moving back and forth on the guides, these bars serve to remove any sawdust or other débris that may have collected on the guides.

The carriage 12 may be moved along the guides 11 by means of a cable or rope 14, which passes from one end of the carriage 12, around a sheave or pulley 15 located at one end of the frame 10, under the carriage 12, and around a second pulley 16 at the other end of the frame 10, several times around a drum 17, around a third pulley 18, and from thence back to the carriage 10. As the drum 17 is rotated, the carriage 12 is drawn along the angle irons 11. I have shown the drum 17 as being driven by a pair of mating gears 19 and 20 and a crank 21, but this is merely one way in which the drum 17 may be rotated.

A table 25 is mounted on the carriage 12 so that it can be tilted relatively thereto about a transverse axis preferably near one end of the carriage. To this end, I have shown each longitudinal bar of the table 25 as passing between a pair of uprights 26 and secured therebetween by means of a bolt 27. The table 25 may be held at any desired angle with the horizontal by means of a pivotally mounted U-shaped bar 28, the parallel legs of which are provided with a series of notches 29 which may be engaged with or disengaged from rods 30 which extend transversely of the carriage.

Mounted on the tilting table 25 is a tiltable stump-support 35. The tiltable stump-support 35 is pivotally attached to the table 25 near the free end thereof. The angle which the table 35 makes with the table 25 may be varied by any suitable means. For this purpose, I have shown a shaft 36 extending transversely of the table 25 and provided at one end with a hand wheel 37 and a ratchet wheel 38. Two ropes or cables 39 are secured to the shaft 36 and their free ends attached to two legs 40 which project downward from the stump support 35. By means of the hand wheel 37, the free end of the tilting stump support can be raised or lowered and is held in fixed position by means of a pawl 41 which engages the teeth of the ratchet wheel 38.

Near that end of the stump support 35 which is pivotally attached to the tilting table 25, I provide an abutment or stop 42. The stump is held in place with its base against the stop 42 by means of the chains 43, the free ends of which may be drawn together around the stump by means of any suitable clamp 44.

Rotatably mounted in suitable bearings on the frame 10 is a transversely extending shaft 45, which may be driven by means of a pulley 46 mounted on one end. Rigidly attached to the center of this shaft is a cutter head 47 which cuts the desired groove in the stump. This cutter may be of any suitable form, but I have shown it as consisting of a pair of wobble saws inclined to the axis of the shaft so that they will cut in the stump a groove wide enough to receive the arbor of the veneer machine.

In operation, the moving carriage 12 is moved to the left-hand end of the frame 10 (as shown in Fig. 3), and a stump-half 49 is clamped in position on the stump support 35 with its base against the stop 42 by means of the chains 43 and clamp 44. The tilting table 25 is then adjusted so that the groove to be cut in the stump will have the desired depth at the base of the stump. The table 25 is held in this position by means of the notched bar 28, the notches of which engage the rods 30 on the tilting table. The angle of the stump support 35 is then adjusted by means of the hand wheel 37 so that the top surface of the stump is substantially horizontal (or parallel to the angle-iron guides 11.) With the cutter revolving, the stump is then drawn over the cutter by means of the crank 21 and cable 14. As this movement proceeds, the desired groove is cut in the longitudinal plane face of the stump as shown in Fig. 2.

As the bottom of the groove is substantially parallel to that portion of the outer surface of the stump which is uppermost when the stump is in position on the tilting table, the knife of the veneer machine, as soon as surface irregularities have been removed, begins to cut veneer of a length equal to the length of the stump.

I have shown, described, and claimed my invention as being used for the grooving of stumps which have been split in half, as that is the customary method of splitting such stumps. However, in some cases, the stump is split longitudinally into thirds or quarters; and in such cases, my stump router can be used to cut grooves in such thirds or quarters.

I claim as my invention:

1. A stump router, comprising a frame, a carriage slidable on said frame, a cutter, a table tiltably mounted on said carriage, a stump support tiltably mounted on said table on an axis parallel to but displaced from the axis about which said table tilts, and means for clamping a stump-half in position on said stump support.

2. A stump router, comprising a frame, a carriage slidable on said frame, a cutter, a table mounted on said carriage and tiltable on an axis transverse to the direction of sliding movement of said carriage, a stump support tiltably mounted on said table on an axis parallel to but displaced from the axis about which said table tilts, an abutment on said stump support, and means for clamping a stump-half in position on said stump support with the butt of said stump-half against said abutment.

3. A stump router, comprising a frame, a carriage slidable on said frame, a cutter, a table mounted on said carriage and tiltable on an axis transverse to the direction of sliding movement of said carriage, a stump support tiltably mounted on said table on an axis parallel to but displaced from the axis about which said table tilts, and means for clamping a stump-half in position on said stump support.

4. A stump router, comprising a frame, a carriage slidable on said frame, a cutter, a table tiltably mounted on said carriage, a stump support tiltably mounted on said table on an axis parallel to but displaced from the axis about which said table tilts, an abutment on said stump support, and means for clamping a stump-half in position on said stump support with the butt of said stump-half against said abutment.

In witness whereof, I have hereunto set my hand at Indianapolis, Indiana, this 24th day of May, A. D. one thousand nine hundred and twenty four.

WILLIAM A. DUNGAN.